US012491709B2

(12) United States Patent
Nishikawa et al.

(10) Patent No.: US 12,491,709 B2
(45) Date of Patent: Dec. 9, 2025

(54) PRINTING DEVICE

(71) Applicant: SEIKO EPSON CORPORATION, Tokyo (JP)

(72) Inventors: Ryo Nishikawa, Shiojiri (JP); Keita Hanawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 201 days.

(21) Appl. No.: 18/477,582

(22) Filed: Sep. 29, 2023

(65) Prior Publication Data

US 2024/0109291 A1 Apr. 4, 2024

(30) Foreign Application Priority Data

Sep. 30, 2022 (JP) ................................ 2022-157638

(51) Int. Cl.
*B41J 2/045* (2006.01)
*B41J 29/02* (2006.01)

(52) U.S. Cl.
CPC ....... *B41J 2/04523* (2013.01); *B41J 2/04586* (2013.01); *B41J 29/02* (2013.01)

(58) Field of Classification Search
CPC .... B41J 2/165; B41J 2/04523; B41J 2/04586; B41J 29/02; B41J 2202/19; B41J 29/13; B41J 2/1752; B41J 2002/14491; B41J 19/005
See application file for complete search history.

(56) References Cited

U.S. PATENT DOCUMENTS 4,750,881 A * 6/1988 Kikuchi .................. B41J 19/20 439/495
2011/0279499 A1* 11/2011 Kemma ................ B41J 19/005 347/9

FOREIGN PATENT DOCUMENTS

JP 2005-021843 A 1/2005
JP 2020-001304 A 1/2020

* cited by examiner

*Primary Examiner* — Thinh H Nguyen
(74) *Attorney, Agent, or Firm* — Dority & Manning, P.A.

(57) ABSTRACT

The printing device includes a head 36 that prints on a medium, a medium support section that has a support surface to support the medium, a head movement section 40 that mounts the head 36 and moves in the front-rear direction Y while straddling the medium support section in the width direction, a control section that controls the head 36, and a connection cable 55 that connects the head 36 and the control section, wherein, the connection cable 55 is located in the region where the head 36 can move in the front-back direction Y and in the space lower than the head 36 in the lower direction Z2.

4 Claims, 5 Drawing Sheets

PRINTING DEVICE

The present application is based on, and claims priority from JP Application Serial Number 2022-157638, filed Sep. 30, 2022, the disclosure of which is hereby incorporated by reference herein in its entirety.

BACKGROUND

1. Technical Field

The present disclosure relates to a printing device such as a printer.

2. Related Art

For example, as shown in JP-A-2005-21843, there is a functional droplet ejection device, which is an example of a printing device that ejects a functional liquid from a functional droplet ejection head, which is an example of a head, onto a workpiece, which is an example of a medium. The functional droplet ejection device is equipped with a head driver, which is an example of a control section, a flexible flat cable, which is an example of a connection cable, a main drive cable, and a piping and wiring support mechanism.

The functional droplet ejection head is movable. The flexible flat cable and the main drive cable connect the functional droplet ejection head to the head driver. The piping and wiring support mechanism holds the flexible flat cable in a suspended manner.

The flexible flat cable of JP-A-2005-21843 is suspended above the functional droplet ejection head. That is, the functional droplet ejection device in JP-A-2005-21843 requires a space above the functional droplet ejection head for the flexible flat cable to pass through. Therefore, the size of the device in height direction increases.

SUMMARY

A printing device that solves the above problem includes, a head configured to print on a medium; a medium support section having a support surface that supports the medium; a movement section on which the head is mounted and that moves in a second direction while straddling the medium support section in a first direction; a control section that controls the head; and a connection cable that connects the head and the control section, wherein the connection cable is disposed in a region in which the head is movable in the second direction and in a space lower than the head.

DESCRIPTION OF EMBODIMENTS

1. Embodiment

Hereinafter, an embodiment of a printing device will be described. The printing device is, for example, an inkjet printer.

In the following description, a direction intersecting (for example, orthogonal to) a vertical direction Z is referred to as a width direction X, and a direction that intersects the vertical direction Z and the width direction X is referred to as a front-rear direction Y. One of the width directions X is a first width direction X1 and the other width directions X is a second width direction X2. One of the front-rear directions Y is a front direction Y1 and the other of the front-rear direction Y is a rear direction Y2. The upper side of the vertical direction Z is an upper direction Z1, and the lower side of the vertical direction Z is as a lower direction Z2. The width direction X corresponds to an example of a first direction. The front-rear direction Y corresponds to an example of a second direction. The vertical direction Z corresponds to an example of a third direction.

1.1. Printing Device 10

Figure 1:
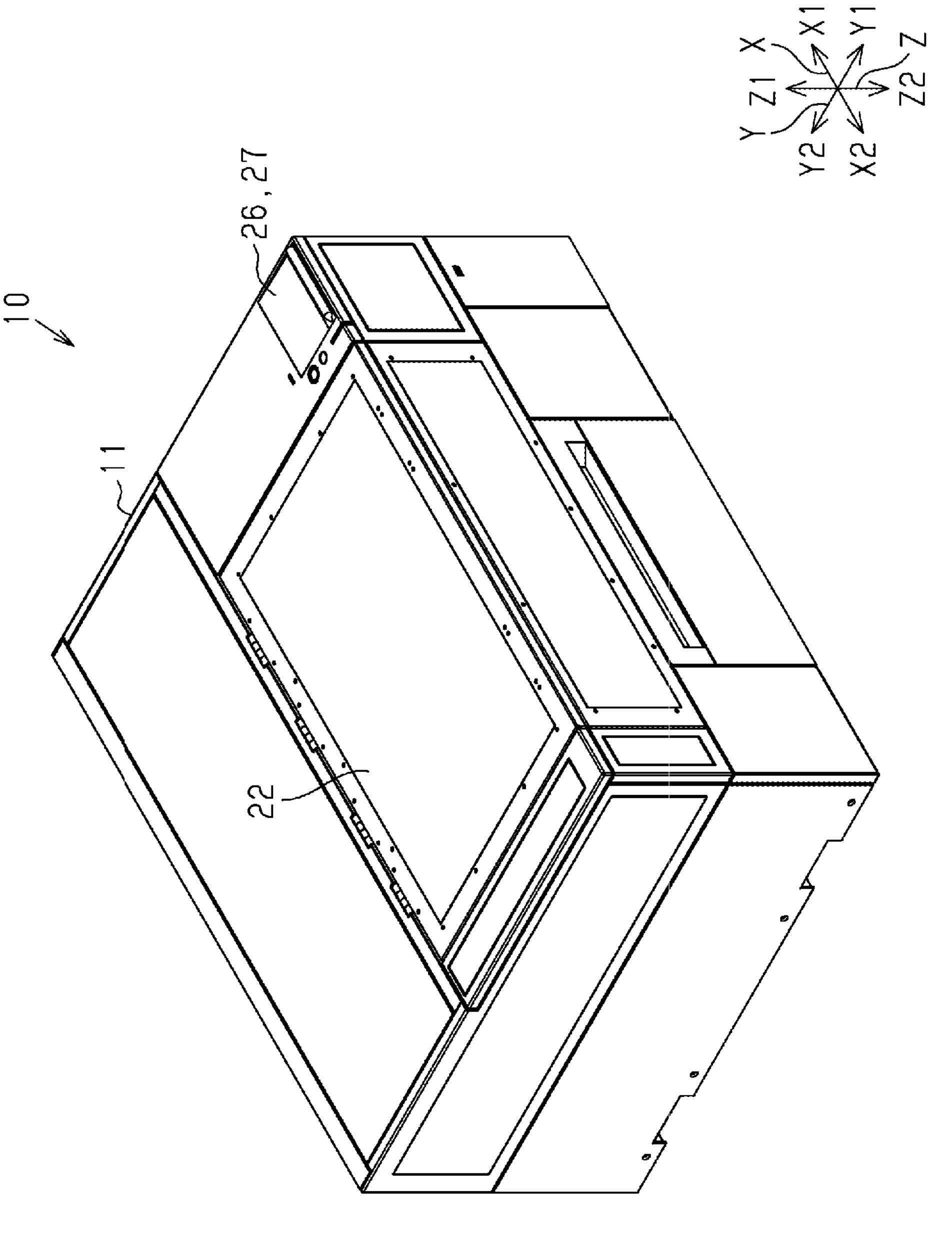
FIG. 1 is a perspective view showing a printing device.

As shown in FIG. 1, the printing device 10 is configured to perform printing on a medium. The printing device 10 may be configured to print on a medium by ejecting a liquid. The printing device 10 may be configured to perform printing on a flexible medium such as a T-shirt. The printing device 10 may be configured so that the medium is placed inside by the user.

The printing device 10 may have a housing 11, an opening and closing cover 22, a display section 26, and an operation section 27. The housing 11 is configured to house various members included in the printing device 10. The opening and closing cover 22 is movable between a closed position shown in FIG. 1 and an open position (not shown). When the opening and closing cover 22 is positioned in the open position, the various members in the housing 11 are exposed. The display section 26 is configured to display information. The operation section 27 is configured to be operated by the user. The display section 26 and the operation section 27 may be configured as a single unit, such as a touch panel, or they may be configured separately.

1.2. Medium Support Section 28

Figure 2:
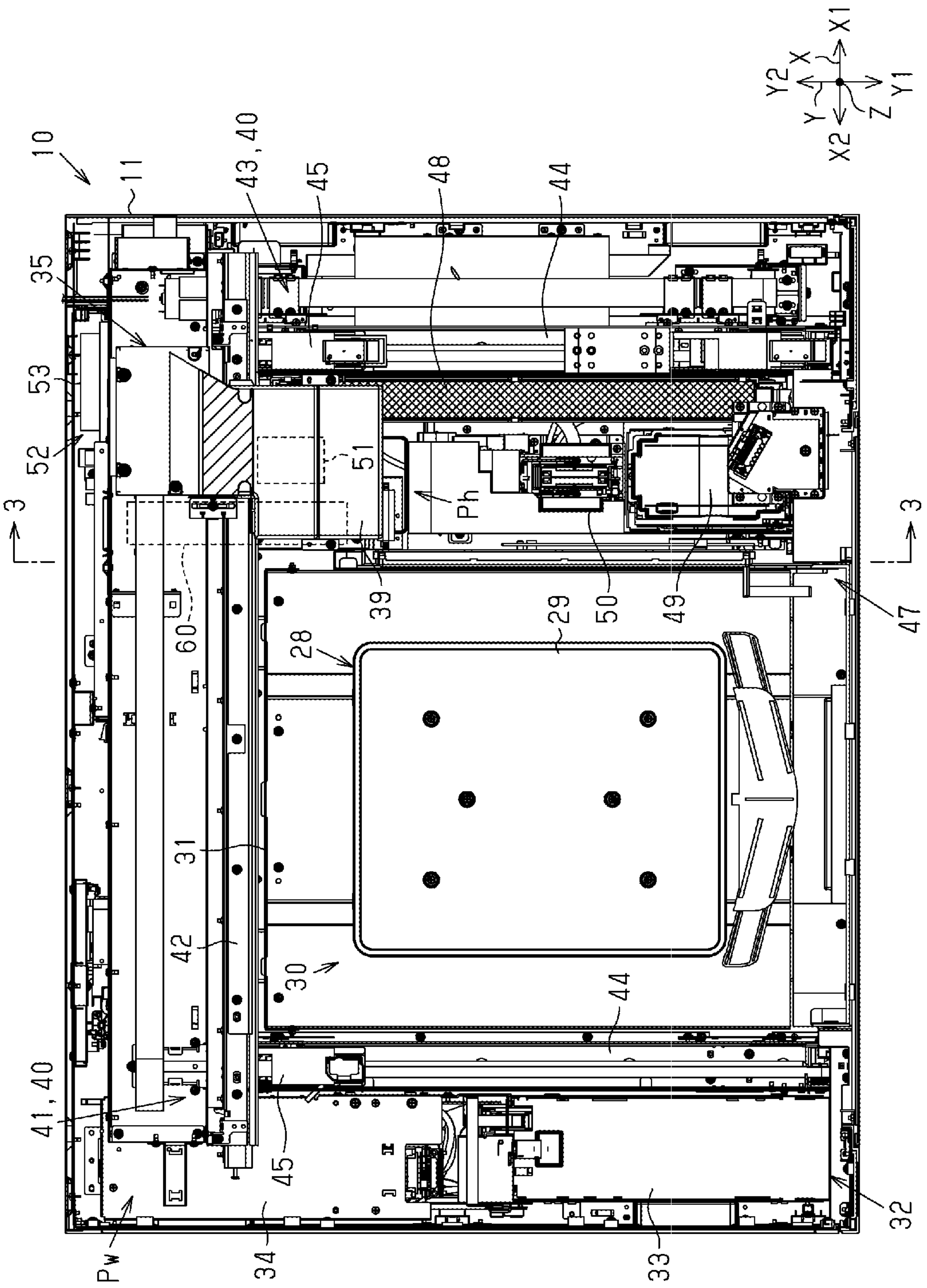
FIG. 2 is a top view showing the printing device.

As shown in FIG. 2, the printing device 10 has a medium support section 28. The medium support section 28 is configured to support the medium. The medium support section 28 has a support surface 29. The support surface 29 is a surface facing the upper direction Z1. That is, the vertical direction Z is a direction perpendicular to the support surface 29. The width direction X and the front-rear direction Y are directions parallel to the support surface 29. The support surface 29 is configured to support a medium. In particular, the support surface 29 is a surface that supports at least a printing region of the medium. The support surface 29 can be said to be a placing surface on which a medium can be placed.

The medium support section 28 is configured not to move in a direction which is parallel to the support surface 29, a horizontal direction. In other words, the support surface 29 is configured not to move in the horizontal direction. The medium support section 28 can adjust a position of the support surface 29 relative to the vertical direction Z.

The printing device 10 may has a medium accommodation section 30. The medium accommodation section 30 is housed in the housing 11. The medium accommodation section 30 is provided at least in the width direction X and the front-rear direction Y of the support surface 29. When some regions of the medium are being supported by the support surface 29, the medium accommodation section 30 can house some regions of the medium that are not supported by the support surface 29.

In particular, the medium accommodation section 30 may be equipped with an accommodation tray 31. The medium accommodation section 30 has a region divided by the accommodation tray 31. The accommodation tray 31 may divide the medium accommodation section 30 at least on the rear direction Y2 side of the support surface 29.

1.3. Liquid Supply Section 32

The printing device 10 may be equipped with a liquid supply section 32. The liquid supply section 32 may be located in the second width direction X2 than the medium support section 28 and the medium accommodation section 30. The liquid supply section 32 is configured to supply liquid to a head 36 (will be described later).

The liquid supply section 32 may have a liquid container 33 and a liquid supply drive section 34. The liquid container 33 is configured to store a liquid to be supplied to the head 36. The liquid container 33 may be a cartridge type, which is detachable, or a tank type, which can be refilled with liquid. The liquid container 33 may have a flat top surface.

The liquid supply drive section 34 drives the liquid supply section 32 to supply the liquid stored in the liquid container 33 to the head 36. The liquid supply drive section 34 may have a liquid supply pump. The liquid supply drive section 34 may have a flat top surface.

1.4. Printing Section 35

The printing device 10 is equipped with a printing section 26. The printing section 35 is configured to print on the medium. In particular, the printing section 35 is configured to print on the medium supported on the support surface 29.

Figure 3:
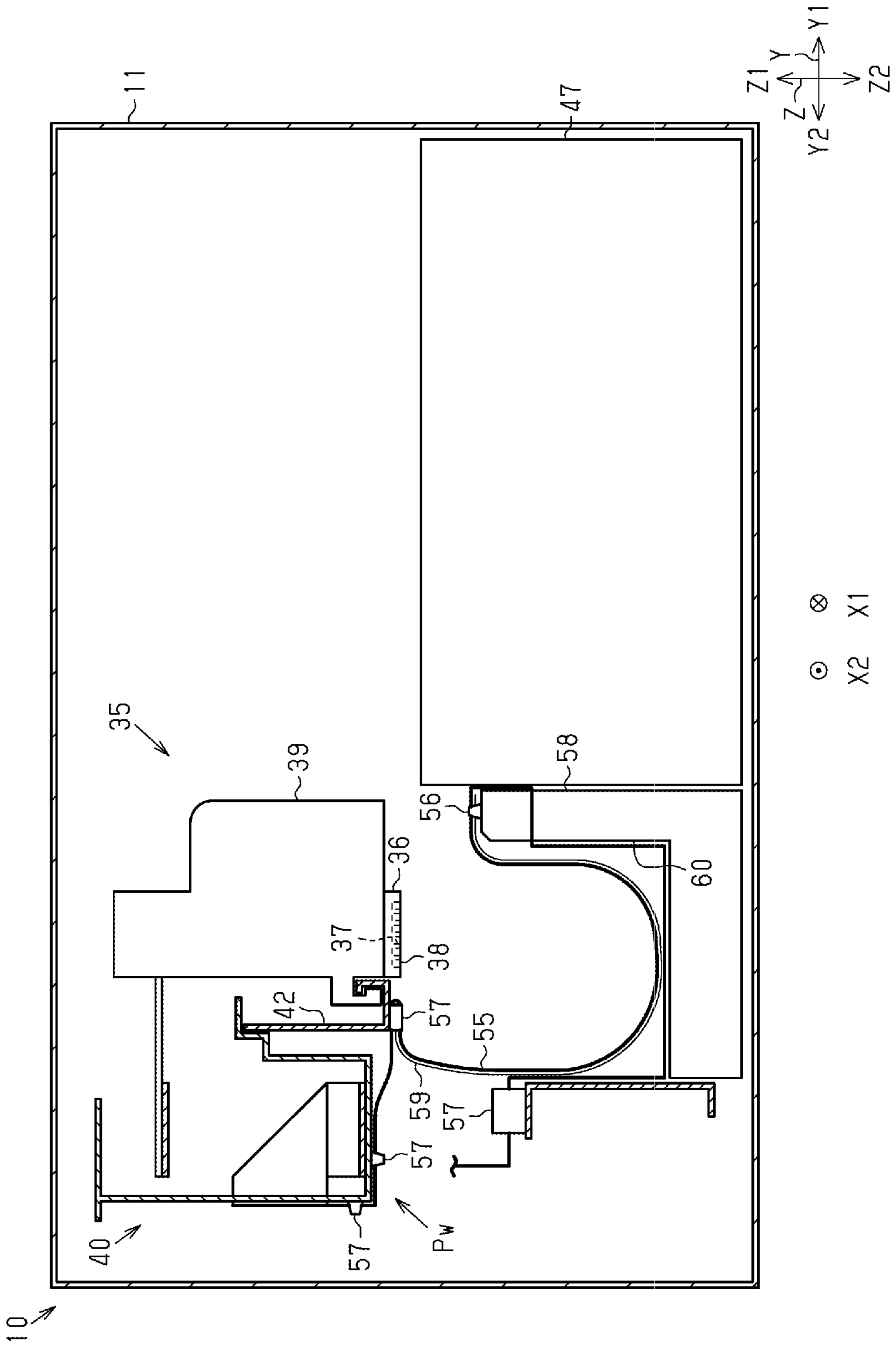
FIG. 3 is a schematic diagram of cross-section of 3-3 line in FIG. 2, viewed in a direction of arrow.

As shown in FIG. 3, the printing section 35 has the head 36 that prints on the medium. The head 36 is capable of ejecting liquid onto the medium supported on the support surface 29. The head 36 has a plurality of nozzles 37 and a nozzle surface 38. The nozzle surface 38 is a surface on which each of the plurality of nozzles 37 are opened. Each of the plurality of nozzles 37 can eject liquid. The nozzle surface 38 is located at the lowermost portion of the head 36, which is the most lower direction Z2 of the head 36.

The printing section 35 is equipped with a carriage 39. The carriage 39 is configured to support the head 36. The head 36 is configured as a serial type, but may be configured as a line type. In the serial type, the head 36 prints while moving in the width direction X. In the line type, the head 36 is provided over the width direction X.

As shown in FIG. 2, the printing section 35 is equipped with a head movement section 40, which is an example of a movement section. The head movement section 40 is configured to move the carriage 39. That is, the head movement section 40 is configured to move the head 36. The head movement section 40 is configured to move the head 36 in the horizontal direction. More specifically, the head movement section 40 is configured to move the head 36 in the width direction X and the front-rear direction Y.

The head movement section 40 may be equipped with a first head movement section 41. The first head movement section 41 is configured to move the carriage 39 in the width direction X. That is, the first head movement section 41 is configured to move the head 36 in the width direction X.

The first head movement section 41 may have a first guide section 42. The first guide section 42 is configured to extend in the width direction X across the support surface 29. The first guide section 42 guides the carriage 39 so that it can move along the width direction X. That is, the carriage 39 moves the head 36 in the width direction X on the head movement section 40. The carriage 39 can reciprocate in the width direction X along the first guide section 42.

The head movement section 40 is equipped with a second head movement section 43. The second head movement section 43 is configured to support the first head movement section 41. The second head movement section 43 is configured to move the first head movement section 41 in the front-rear direction Y. That is, the second head movement section 43 is configured to move the head 36 in the front-rear direction Y.

The second head movement section 43 may have a pair of second guide sections 44. The pair of second guide sections 44 are provided in the first width direction X1 of the medium support section 28 and in the second width direction X2 of the medium support section 28. Each of the pair of second guide sections 44 is configured to extend in the front-rear direction Y.

The second head movement section 43 may have a pair of support sections 45. The pair of support sections 45 are provided in the first width direction X1 of the medium support section 28 and in the second width direction X2 of the medium support section 28. Each of the pair of support sections 45 is configured to support the first head movement section 41. The pair of support sections 45 are movable in the front-rear direction Y along the corresponding pair of second guide sections 44.

In this way, the head movement section 40, which mounts the head 36, can move in the front-rear direction Y in a state of straddling the medium support section 28 in the width direction X. The head movement section 40 is configured in a gate-like shape when viewed from the front. The head movement section 40 can move to a standby position Pw shown in FIG. 3, to a printing position, and to an end position Pe shown in FIG. 5.

The standby position Pw is a position where the head movement section 40 stands by when not printing. The standby position Pw is the position that is the most rearward in the rear direction Y2 side, in the range where the head movement section 40 can move in the front-rear direction Y.

The printing position is a position between the standby position Pw and the end position Pe. The printing position is a position where the medium support section 28 and the head 36 can face each other. The end position Pe is a position that is the most frontward in the front direction Y1 side, in the range where the head movement section 40 can move in the front-rear direction Y. The head movement section 40 can move in the front direction Y1 from the standby position Pw, pass through the printing position, and move to the end position Pe. The head movement section 40 can move in the rear direction Y2 from the end position Pe, pass through the printing position, and move to the standby position Pw.

1.5. Maintenance Section 47

As shown in FIG. 2, the printing device 10 may is equipped with a maintenance section 47. The maintenance section 47 is provided in the first width direction X1 than the medium support section 28 and the medium accommodation section 30. The maintenance section 47 is located in a position that does not overlap in the vertical direction with respect to the medium support section 28 and the medium accommodation section 30. The maintenance section 47 may be located in line with the medium support section 28 and the medium accommodation section 30 in the width direction X. The maintenance section 47 is configured to maintain the head 36.

The maintenance section 47 may have a flushing section 48. The flushing section 48 is configured to receive the liquid ejected from the head 36. The flushing section 48 is configured to extend in the front-rear direction Y.

The maintenance section 47 may have a wiping section 49. The wiping section 49 can wipe the nozzle surface 38.

The maintenance section 47 may have a suction section 50. The suction section 50 is configured to suck liquid from the head 36. The suction section 50 may include a suction pump that draws liquid from the head 36.

The maintenance section 47 may have a cap 51. The cap 51 is provided directly below the head 36, which is located at the home position Ph. The cap 51 is configured to reciprocate in the vertical direction Z. The cap 51 caps the head 36 by moving upward and coming into contact with the head 36.

1.6. Control Substrate 52 and Power Supply Unit 54

The printing device 10 may have a control substrate 52. The control substrate 52 is housed in the housing 11. The control substrate 52 may be located in the rearward than the head movement section 40 in the rear direction Y2. The control substrate 52 is a substrate on which various electronic components for controlling the printing device 10 are mounted.

The control substrate 52 may have a control section 53. The control section 53 controls the head 36. The control section 53 controls various operations performed by the printing device 10. The control section 53 can be configured as a circuit that includes α: one or more processors that execute various processes according to a computer program, β: one or more dedicated hardware circuits that execute at least some of various processes, or γ: a combination thereof. The hardware circuit is, for example, an application specific integrated circuit. The processor includes a CPU and memory, such as RAM and ROM, which stores program code or instructions configured to cause the CPU to perform processing. The memory, that is, the computer-readable medium, includes any readable medium that can be accessed by a general purpose or special purpose computer.

1.7. Connection Cable 55

As shown in FIG. 3, the printing device 10 is equipped with a connection cable 55. The printing device 10 may have an intermediate fixing section 56, an auxiliary fixing section 57, a cable support section 58, and a cable guide 59. The cable support section 58 may have a surplus cable housing section 60. The printing device 10 may have a plurality of the connection cables 55, the auxiliary fixing sections 57, the cable supporting sections 58, and the cable guides 59, each.

The connection cable 55 connects the head 36 and the control section 53. The connection cable 55 is, for example, a flexible flat cable that is wide and flexible. The intermediate fixing section 56 fixes the connection cable 55 in the intermediate portion of a connection path from the control section 53 to the head 36. The connection path is a path through which the connection cable 55 passes. The intermediate fixing section 56 fixes an end portion of a connecting side of the connection cable 55, which is deformed as the head movement section 40 moves. The intermediate fixing section 56 may be a way to fix the connection cable 55 to the fixedly located cable supporting section 58. The cable support section 58 and the intermediate fixing section 56 are located lower than the head 36 in the lower direction Z2.

The auxiliary fixing section 57 may fix the connection cable 55 between the intermediate fixing section 56 and the head 36 in the connection path to the head movement section 40. For example, the auxiliary fixing section 57 may fix the connection cable 55 to the first guide section 42, which is movable. The connection cable 55 may be connected to the head 36 via the first guide section 42 and the carriage 39. The auxiliary fixing section 57 may fix the connection cable 55 between the intermediate fixing section 56 and the control section 53 in the connection path to the cable support section 58, the frame of the printing device 10, or the like.

The cable support section 58 supports the connection cable 55 from the control section 53 to the intermediate fixing section 56. The cable support section 58 may support the connection cable 55 provided along a wall surface of the surplus cable housing section 60.

The connection cable 55 that become slack due to the movement of the head movement section 40 is housed in the surplus cable housing section 60. The surplus cable housing section 60 may house the connection cable 55 that is between the intermediate fixing section 56 and the auxiliary fixing section 57 which is located on the head 36 side from the intermediate fixing section 56.

As shown in FIG. 2, the surplus cable housing section 60 may be located between the cap 51 and the medium support section 28 in the width direction X. The surplus cable housing section 60 may be located between the cap 51 and the accommodation tray 31 in the width direction X. The surplus cable housing section 60 may be located in the second width direction X2 from at least one of the flushing section 48, the wiping section 49, the suction section 50, and the cap 51.

Figure 4:
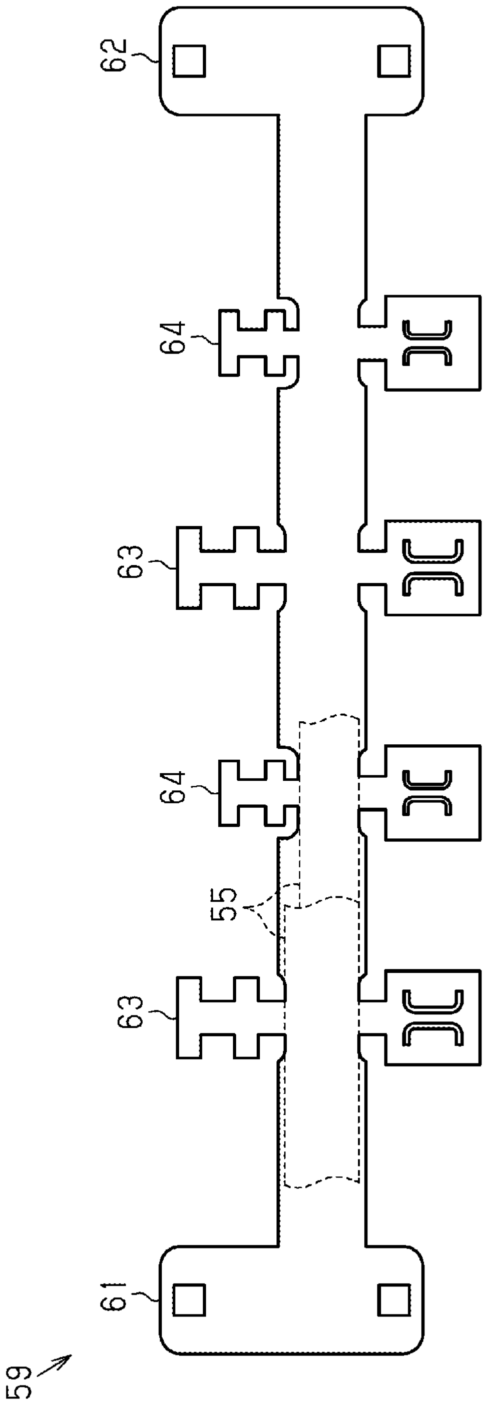
FIG. 4 is a plan view of a cable guide.

As shown in FIG. 3 and FIG. 4, the cable guide 59 may bundle a plurality of connection cables 55 in an overlapping manner. The cable guide 59 is flexible and can be flexed and deformed. The cable guide 59 is less likely to be twisted than the connection cable 55. The cable guide 59 guides a slack portion of the connection cable 55 into the surplus cable housing section 60. The cable guide 59 guides a portion of the connection cable 55 between the cable support section 58 and the head movement section 40.

The cable guide 59 may have a first attachment section 61, a second attachment section 62, a first binding section 63, and a second binding section 64. The cable guide 59 may have a plurality of first binding sections 63 and a plurality of second binding sections 64.

The first attachment section 61 may be attached to the head movement section 40 together with the connection cable 55 by the auxiliary fixing section 57. The second attachment section 62 may be attached to the cable support section 58 together with the connection cable 55 by the intermediate fixing section 56.

The first binding section 63 is wider than the second binding section 64. The first binding section 63 can fasten a wider connection cable 55 than the second binding section 64. When fastening multiple connection cables 55 of different widths, at first, fasten a narrow connection cable 55 by using the second binding section 64. Then, a wider connection cable 55 is overlapped on the narrow connection cable 55, and both connection cables 55 are fastened by using the first binding section 63. By fastening connection cables 55 of different widths by the first binding section 63 and the second binding section 64, it is difficult for the narrow connection cable 55 to move with respect to the wider connection cable 55. Noise may be generated when the position between the plurality of connection cables 55 fluctuates. However, noise generation can be reduced by making the position between the plurality of connection cables 55 less likely to change.

Figure 5:
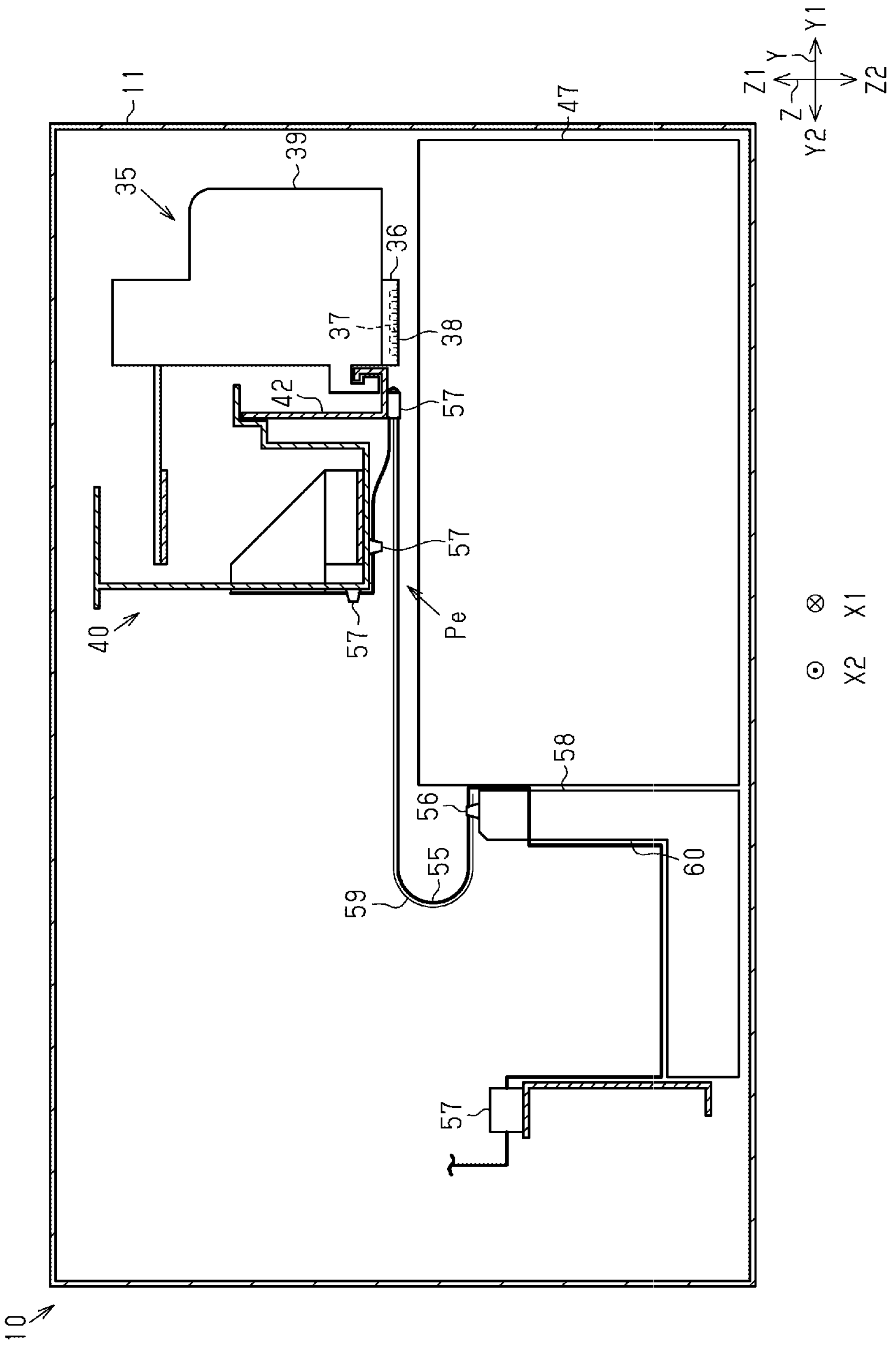
FIG. 5 is a schematic diagram of the printing device in which the head movement section is positioned at the end position.

As shown in FIG. 3 and FIG. 5, the connection cable 55 is located in a region where the head 36 can move in the front-rear direction Y and in a space lower than the head 36 in the lower direction Z2. Specifically, at least a part of the connection cable 55 from the intermediate fixing section 56 to the head 36 is located in the space lower than the head 36 in the lower direction Z2. As shown in FIG. 5, when the connection cable 55 extends from the intermediate fixing section 56 in a direction different from the direction in which the head 36 is located in the front-rear direction Y, the direction of the connection cable 55 changes between the intermediate fixing section 56 and the head 36 so that it is toward the head 36. The connection cable 55 is more likely to stay in the space between the intermediate fixing section 56 and the head 36 in the vertical direction Z due to the elastic force at the deformation portion where the direction changes.

1.8. Action of Embodiment

The action of this embodiment will be described. As shown in FIG. 3, the connection cable 55 is housed in the surplus cable housing section 60 when the head movement section 40 is in the standby position Pw.

As shown in FIG. 5, a part of the connection cable 55 is pulled out from the surplus cable housing section 60 as the head movement section 40 moves in the front direction Y1 from the standby position Pw. A part of the connection cable 55 is housed in the surplus cable housing section 60 as the head movement section 40 moves in the rear direction Y2 from the end position Pe.

1.9. Effect of Embodiment

The effects of this embodiment will be described.

(1) The connection cable 55 is located in a region where the head 36 can move in the front-rear direction Y and in the space lower than the head 36 in the lower direction Z2. Therefore, since the limited space in the printing device 10 can be effectively used, the size of the device can be reduced.

(2) The intermediate fixing section 56 fixes the connection cable 55. The cable support section 58 supports the connection cable 55 between the control section 53 and the intermediate fixing section 56. Therefore, it is possible to stabilize the behavior of the connection cable 55 while allowing the connection cable 55 to be deformed as the head movement section 40 moves.

(3) Since the connection cable 55 is fixed by the intermediate fixing section 56, the portion between the intermediate fixing section 56 and the head 36 may become slack when the head movement section 40 moves. In this regard, the cable support section 58 has the surplus cable housing section 60. That is, the cable support section 58 supports a portion of the connection cable 55 that does not slacken, and can house a portion of the connection cable 55 that bends. Therefore, the space can be used effectively.

(4) The surplus cable housing section 60 houses the connection cable 55 when the head movement section 40 is in the standby position Pw. Therefore, the head movement section 40 can be smoothly moved from the printing position to the standby position Pw.

(5) The carriage 39 moves the head 36 in the width direction X. Therefore, the head 36 can be made smaller than when the head 36 is provided across the width direction X.

2. Modification

This embodiment can be modified as follows. This embodiment and the following modifications can be implemented in combination with each other within a range that is not technically contradictory.

The printing section 35 may print when the head 36 moves in one of the front direction Y1 and the rear direction Y2, or it may print both when the head 36 moves in the front direction Y1 and when the head 36 moves in the rear direction Y2.

The printing section 35 may print when the head 36 moves in one of the first width direction X1 and the second width direction X2, or it may print both when the head 36 moves in the first width direction X1 and when the head 36 moves in the second width direction X2.

The head 36 may have a nozzle surface 38 that is parallel to the horizontal plane or that is inclined to the horizontal plane.

The surplus cable housing section 60 may be located in the front direction Y1 than in the center of the printing device 10, in the front-rear direction Y.—The connection cable 55 may be housed in the surplus cable housing section 60 when the head movement section 40 is in the end position Pe.

The surplus cable housing section 60 may be provided separately from the cable support section 58.

The printing device 10 may be configured without the intermediate fixing section 56. For example, the connection cable 55 may be affixed to the cable support section 58.

At least a part of the connection cable 55 from the control section 53 to the intermediate fixing section 56 may be located in the space lower than the head 36 in the lower direction Z2.

The intermediate fixing section 56 may be located upper than the head 36 in the upper direction Z1.

The cable guide 59 may bundle a supply tube for supplying liquid from the liquid container 33 to the head 36 together with the connection cable 55.

The surplus cable housing section 60 may house the supply tube together with the connection cable 55.

The medium is not limited to a T-shirt, a polo shirt, for example, but can also be a sweatshirt and a hoody, for example, or any other medium that is used as clothing. clothing. Although a flexible medium was employed as the medium, it is not limited to this, and a non-flexible medium may also be employed, for example, a smartphone case printed using UV ink.

The printing device 10 may be configured to eject ink as an example of liquid, but may also be configured to eject liquid other than ink. In other words, any liquid can be selected as long as it is capable of adhering to the medium and printing on it. The printing device 10 prints on a medium by ejecting liquid onto the medium, but is not limited to this, for example, a laser system may be used to print on a medium.

3. Definition

The expression “at least one” as used herein means “one or more” of the desired alternatives. As an example, the expression "at least one" as used herein means "only one option" or "both of two options" if the number of options is two. As another example, the expression "at least one" as used herein means "only one option" or "any combination of two or more options" if the number of options is three or more.

4. Note

Hereinafter, technical ideas grasped from the above-described embodiment and modifications, and operations and effects thereof, will be described.

A. A printing device includes a head configured to print on a medium; a medium support section having a support surface that supports the medium; a movement section on which the head is mounted and that moves in a second direction while straddling the medium support section in a first direction; and a control section that controls the head; and a connection cable that connects the head and the control section, wherein the connection cable is disposed in a region in which the head is movable in the second direction and in a space lower than the head.

According to this configuration, the connection cable is located in a region where the head can move in the second direction and in a space lower than the head in a lower direction. Therefore, since the limited space in the printing device can be used effectively, the size of the device can be downsized.

B. The printing device may include an intermediate fixing section that fixes the connection cable at an intermediate portion of a connection path from the control section to the head and a cable support section that supports the connection cable from the control section to the intermediate fixing section, wherein at least a portion of the connection cable from the intermediate fixing section to the head is located in the space.

According to this configuration, the intermediate fixing section fixes the connection cable. The cable support section supports the connection cable between the control section and the intermediate fixing section. Therefore, it is possible to stabilize the behavior of the connection cable while allowing the connection cable to be deformed as the movement section moves.

C. In the printing device, the cable support section may have a surplus cable housing section to house the connection cable that become slack due to the movement of the movement section.

Since the connection cable is fixed by the intermediate fixing section, a portion between the intermediate fixing section and the head may become slack when the movement section moves. In this regard, according to this configuration, the cable support section has the surplus cable housing section. That is, the cable support section supports a portion of the connection cable that does not slacken, and can house a portion of the connection cable that bends. Therefore, the space can be used effectively.

D. In the printing device, the movement section may be configured to move between a standby position where the movement section stands by while not printing, and a printing position where the medium support section and the head can face each other, and the connection cable may be housed in the surplus cable housing section when the movement section is in the standby position.

According to this configuration, the surplus cable housing section houses the connection cable when the movement section is located in the standby position. Therefore, the movement section can be smoothly moved from the printing position to the standby position.

E. The printing device may include a carriage that moves the head in the first direction over the movement section.

According to this configuration, the carriage moves the head in the first direction. Therefore, the head can be made smaller than when the head is provided across the width direction X.

What is claimed is:

1. A printing device comprising:

a head configured to print on a medium;

a medium support surface that supports the medium;

a head movement system on which the head is mounted and that moves in a second direction while straddling the medium support surface in a first direction;

a control circuit that controls the head;

a connection cable that connects the head and the control circuit, wherein the connection cable is disposed in a region in which the head is movable in the second direction and in a space lower than the head;

an intermediate fixing support that fixes the connection cable at an intermediate portion of a connection path from the control circuit to the head, and a cable support section that is L-shaped when viewed in the first direction and supports the connection cable from the control circuit to the intermediate fixing support, wherein at least a portion of the connection cable from the intermediate fixing support to the head is located in the space defined by the head and the cable support section when viewed in the first direction.

2. The printing device according to claim 1, wherein the cable support section has a surplus cable housing section to house the connection cable that becomes slack due to the movement of the head movement system.

3. The printing device according to claim 2, wherein the head movement system is configured to move between a standby position where the head movement system stands by while not printing, and a printing position where the medium support surface and the head are faceable to each other and the connection cable is housed in the surplus cable housing section when the head movement system is in the standby position.

4. The printing device according to claim 1, further comprising:

a carriage that moves the head in the first direction over the head movement system.

* * * * *